United States Patent [19]

Spadafora et al.

[11] Patent Number: 5,071,199
[45] Date of Patent: Dec. 10, 1991

[54] ANTILOCK BRAKE SYSTEM WITH MOTOR CURRENT CONTROL

[75] Inventors: Peter J. Spadafora, Howald, Luxembourg; Kevin G. Leppek, Troy, Mich.

[73] Assignees: General Motors Corp., Detroit, Mich.; Delco Electronics Corp., Kokomo, Ind.

[21] Appl. No.: 558,329

[22] Filed: Jul. 26, 1990

[51] Int. Cl.[5] .............................................. B60T 8/58
[52] U.S. Cl. .............................. 303/100; 303/DIG. 4
[58] Field of Search ............... 303/100, 103, 108, 113, 303/114, 115, 116, 109, 94

[56] References Cited

U.S. PATENT DOCUMENTS

| | | | |
|---|---|---|---|
| 4,750,124 | 6/1988 | Lin et al. | 303/DIG. 4 |
| 4,755,946 | 7/1988 | Lin | 303/DIG. 4 |
| 4,807,134 | 2/1989 | Agarwal et al. | 346/426.02 |
| 4,941,553 | 7/1990 | Harrison | 303/114 |

Primary Examiner—Matthew C. Graham
Attorney, Agent, or Firm—Howard N. Conkey

[57] ABSTRACT

The motor current in a vehicle antilock brake system motor driven pressure modulator is increased in stepwise fashion to ramp the brake pressure in the apply phase of an antilock braking cycle. At the beginning of each current step as the motor current is increased in stepwise fashion, the motor torque is increased momentarily at least by an amount to assure that the static friction of the pressure modulator is overcome and that motor rotation is initiated. The motor torque is increased to a value to initiate motor rotation at the beginning of each current step by momentarily increasing the motor current to a value greater than the current step value by a predetermined amount that assures that the increase of motor torque exceeds the static friction of the pressure modulator.

4 Claims, 4 Drawing Sheets

ANTILOCK BRAKE SYSTEM WITH MOTOR CURRENT CONTROL

BACKGROUND OF THE INVENTION

This invention relates to an antilock control method for vehicle wheel brakes.

When the brakes of a vehicle are applied, a braking force is generated between the wheel and the road surface that is dependent upon various parameters which include the road surface condition and the amount of slip between the wheel and the road surface. This braking force increases as slip increases until a critical value of slip is surpassed. Beyond the critical value of slip, the braking force decreases and the wheel rapidly approaches lockup. Therefore, to achieve stable braking, an antilock control system seeks to operate wheel slip at or near the critical slip value. An antilock control system achieves this objective by detecting an incipient wheel lock condition. Upon detecting an incipient wheel lock condition, the antilock control system releases pressure at the wheel brake to allow recovery from the incipient wheel lock condition. Upon recovery, brake pressure is reapplied. Criteria used to indicate an incipient wheel lock condition includes excessive wheel deceleration and/or excessive wheel slip.

One known antilock control system uses a motor driven pressure modulator in which a DC torque motor drives a piston in a cylinder whose volume is modulated to control the hydraulic brake pressure at the wheel brake. In this system, because of the relationship between motor current, motor torque and motor load represented by the hydraulic brake pressure on the head of the piston, the value of motor current is used as a representation of brake pressure and is controlled to provide control of the brake pressure. In one such system, when an incipient wheel lock condition is sensed, the value of motor current at this time is stored as a representation of the brake pressure producing the maximum braking force coexisting with the critical slip between the wheel and the road surface and the motor current is controlled to quickly retract the piston to release brake pressure to allow recovery from the incipient wheel lock condition. When a recovery from the incipient wheel lock condition is sensed, the motor current is controlled to extend the piston to re-apply brake pressure. In re-applying the brake pressure, the pressure is quickly established substantially at the brake pressure producing the maximum braking force by quickly establishing the motor current at a significant fraction of the motor current stored at the time an incipient wheel lock condition was sensed. Thereafter, brake pressure is ramped at a controlled rate which may be a function of wheel slip and acceleration by ramping the motor current in direction applying brake pressure until an incipient wheel lock condition is again sensed after which the cycle is repeated.

Typically, in these systems the brake pressure is ramped by repeatedly increasing the motor current in stepwise fashion. In this form of control, the motor current is incremented by some determined step value at repeated time intervals. The ramp rate of the current and therefore the rate of increase of the applied brake pressure is established by varying one or both of the step value and the value of the repeated time interval. When the current is increased in this stepwise fashion, there is a potential for the motor to stop when the brake pressure/motor torque balance is reached prior to the next step increase in the motor current. When this condition occurs, the motor may remain stationary even after the next step increase in the motor current as a result of the static friction of the modulator which must be overcome before movement will again begin. While the increase in motor torque resulting from the current step is sufficient to overcome the dynamic friction of the modulator, if the amount of the current step is not adequate to increase the motor torque by the amount required to overcome this static friction which is greater than the dynamic friction, the motor will not rotate and the brake pressure will not be ramped. The motor will again rotate to increase pressure only when the motor current is increased by additional subsequent steps to the level such that the static friction is overcome. The effect of the foregoing is an erratic increase in the brake pressure during the ramping portion of the antilock braking cycle.

SUMMARY OF THE INVENTION

In general, this invention assures that the motor in a wheel lock control system motor driven pressure modulator as set forth above will begin to rotate to increase brake pressure each time the motor current is stepped during the pressure ramp portion of an antilock brake cycle even when the motor torque increase resulting from the current step value, which great enough to overcome the dynamic friction of the pressure modulator once rotation has begun, is otherwise inadequate to overcome the larger static friction of the pressure modulator.

In accord with this invention, at the beginning of each current step as the motor current is increased in stepwise fashion, the motor torque is increased momentarily at least by an amount to assure that the static friction of the pressure modulator is overcome and that motor rotation is initiated. The motor torque is increased to a value to initiate motor rotation at the beginning of each current step by momentarily increasing the motor current to a value greater than the current step value by a predetermined amount that assures that the increase of motor torque exceeds the static friction of the pressure modulator. The duration of the momentary increase in motor current is established based on a predetermined time constant of the motor driven pressure modulator. By momentarily increasing the value of the stepped current at the beginning of each step so as to assure rotation of the motor with each step, a smooth predictable increase in the brake pressure is provided in response to stepwise ramping of the motor current.

DESCRIPTION OF THE DRAWINGS

The invention may be best understood by reference to the following description of the preferred invention and the drawings in which: embodiment of the FIG. 1 is a diagram of a wheel braking system including a motor driven pressure modulator for limiting the wheel brake pressure for antilock brake control.

1 while ramping the current during the apply phase of an antilock brake control cycle.

DESCRIPTION OF THE PREFERRED EMBODIMENT

Figure 1:
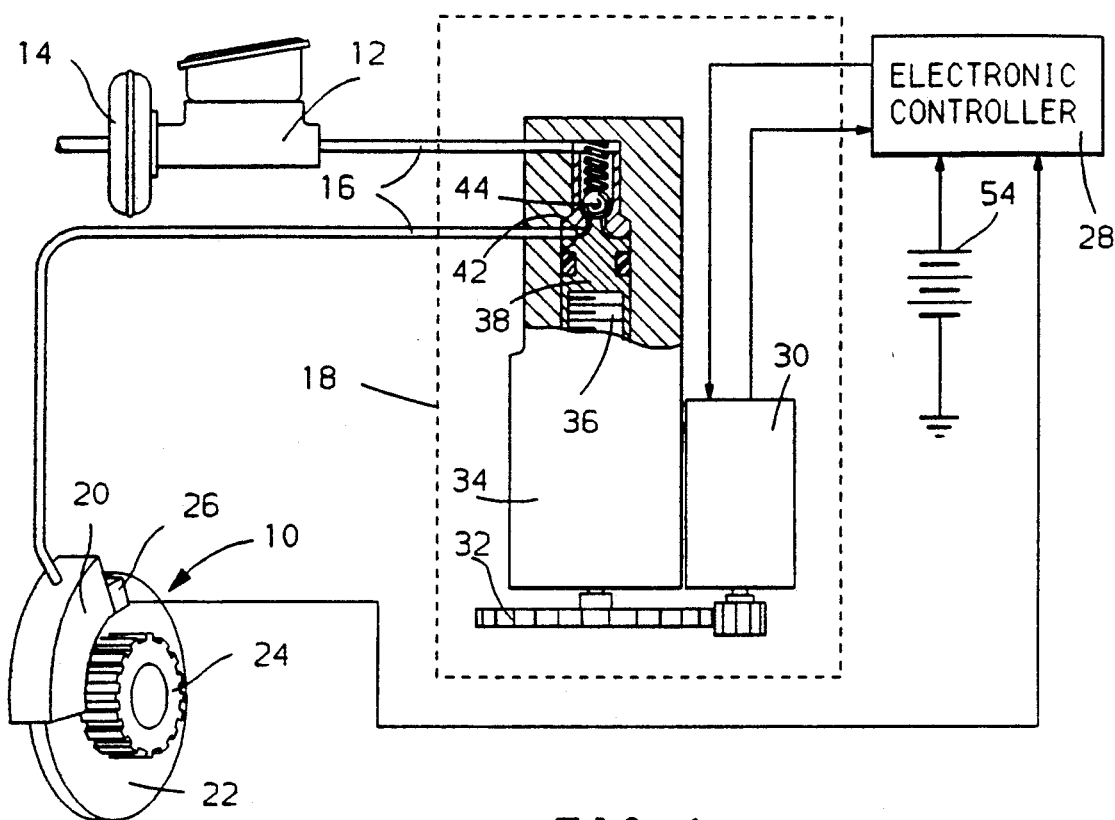

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disc brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lockup. The modulator 18 is illustrated in an inactive position where it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region.

The pressure modulator 18 includes a DC torque motor 30 whose output shaft drives a gear train 32 which, in turn, rotates a linear ballscrew actuator 34. The ballscrew actuator contains a linearly stationary ballscrew which, when rotated, linearly positions a nut 36. The nut 36 terminates in a piston 38 such that as the linear ballscrew rotates, the piston 38 is either extended or retracted depending upon the direction of rotation of the torque motor 30. The modulator 20 includes a housing 40 in which a cylinder 42 is formed. The piston 38 is reciprocally received within the cylinder 42. The cylinder 42 forms a portion of the fluid path between the master cylinder 12 and the wheel brake unit 10. Included within this fluid path is a normally closed ball check valve 44 which, when closed, isolates the master cylinder 12 from the wheel brake unit 10. The ball check valve 44 is operated to an open position by the piston 38 when it is positioned in an extended position within the cylinder 42 as illustrated in FIG. 1. This position is the home position of the modulator 18.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted allowing the ball check valve to seat and isolate the master cylinder 12 from the wheel brake unit 10 as long as the pressure in the cylinder 42 is less than the pressure from the master cylinder 12. Further retraction of the piston 48 functions to increase the volume in the cylinder 42 thereby decreasing the pressure applied to the wheel brake unit 10. By controlling the DC torque motor 30, pressure at the wheel brake can be modulated to controlled values less than the master cylinder 12 pressure output until such time that the piston 38 again unseats the ball check valve 44 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Figure 2:
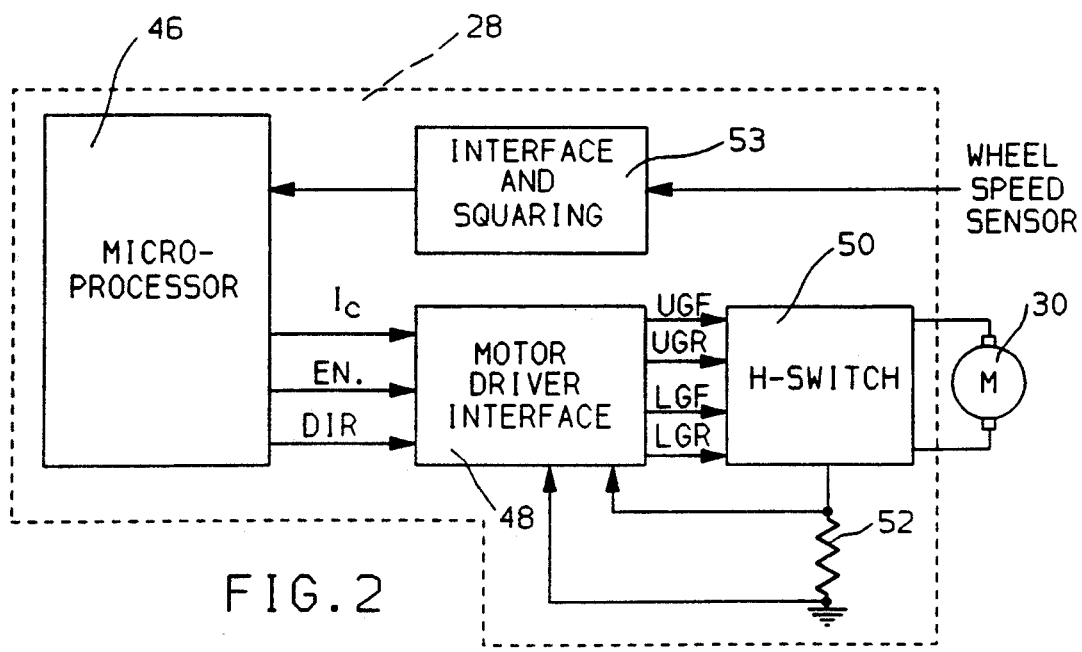
FIG. 2 is a diagram of the electronic controller of FIG. 1 for controlling the current to the motor of the motor driven pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory which also stores tables and constants utilized in controlling the modulator 18, an analog-to-digital converter, a random access memory and input/output circuitry utilized to provide motor control signals to a motor driver interface circuit 48. The input/output circuit further includes input ports for receiving the wheel speed signal from the output of an interface and squaring circuit 53 having in turn an input from the wheel speed sensor 26.

The motor driver interface circuit 48 receives an enable signal EN, a motor current command signal $I_c$ and a forward/reverse direction signal DIR from the microprocessor 46 and controls an H-switch driver 50 to establish the commanded motor current $I_c$ in the required forward or reverse direction. The current to the torque motor 30 is controlled to the commanded value via a closed loop that responds to the actual motor current represented by the voltage across a sense resistor 52. In response to the direction and motor current commands, the motor driver interface 48 energizes the H-switch upper and lower forward gates via the upper gate signal UGF and lower gate signal LGF to control the DC torque motor 30 in the forward direction to apply brake pressure and energizes the H-switch upper and lower reverse gates via the signals UGR and LGR to control the DC torque motor 30 in the reverse direction to retract the piston 38 to reduce pressure at the wheel brake. The microprocessor 46 may take the form of a Motorola single chip microcomputer MC 68HC11. The motor driver interface 48 and H-switch 50 may take the form of the driver illustrated in the U.S. Pat. No. 4,835,695 issued May 30, 1989.

During a typical antilock brake control cycle established by the system of FIGS. 1 and 2, when an incipient wheel lock condition is sensed, the motor current is controlled to quickly retract the piston 38 to release brake pressure to allow recovery from the incipient wheel lock condition. This reversal is accomplished by commanding a reverse motor direction and setting the command current $I_c$ at a reverse current value $I_r$. The motor driver interface 48 responds to these commands by energizing the upper and lower reverse H-switch gate switches to drive the motor 30 in the reverse direction at the commanded current level. When recovery from the incipient wheel lock condition is sensed, brake pressure is re-applied and ramped by commanding a forward motor direction and setting the command current $I_c$ at a forward apply current value $I_a$. The motor driver interface responds to these commands by energizing the upper and lower H-switch gate switches to drive the motor in a forward direction at the commanded current level. Brake pressure is ramped by ramping the value of the apply current $I_a$. This ramp function is continued until an incipient wheel lock condition is again sensed after which the cycle is repeated. In general, the ramp rate may be decreased with increasing wheel slip and wheel deceleration so that the ramp rate is smaller as the wheel approaches an incipient wheel lockup condition.

The ramping of the brake pressure by ramping the value of the apply current $I_a$ is provided by increasing the value of $I_a$ in stepwise fashion. The ramp rate is controlled by adjusting the value of the current step and the time period between steps. As previously indicated, during the ramping of the motor current to ramp brake pressure, the motor may come to rest between steps of the motor current giving rise to the condition wherein the value of the motor current step may be inadequate to re-initiate rotation of the motor due to the static friction of the modulator 18 which is greater than the modulator dynamic friction. Accordingly, this invention provides for a further increase in the motor torque at the beginning of each current step to a value to assure initiation of rotation by providing an additional amount of current added to the current step which assures that the motor torque is adequate to initiate motor rotation to increase brake pressure. After the short period required to initiate motor rotation, which period is at least greater than the time constant of the pressure modulator, the current is returned to the normal stepped value. The motor will continue to rotate until such time that a balance is established between the resulting motor torque and brake pressure. This process is repeated with each current step thereby providing for a smooth predictable increase in the brake pressure in accord with the ramp rate of the motor current.

Figure 3:
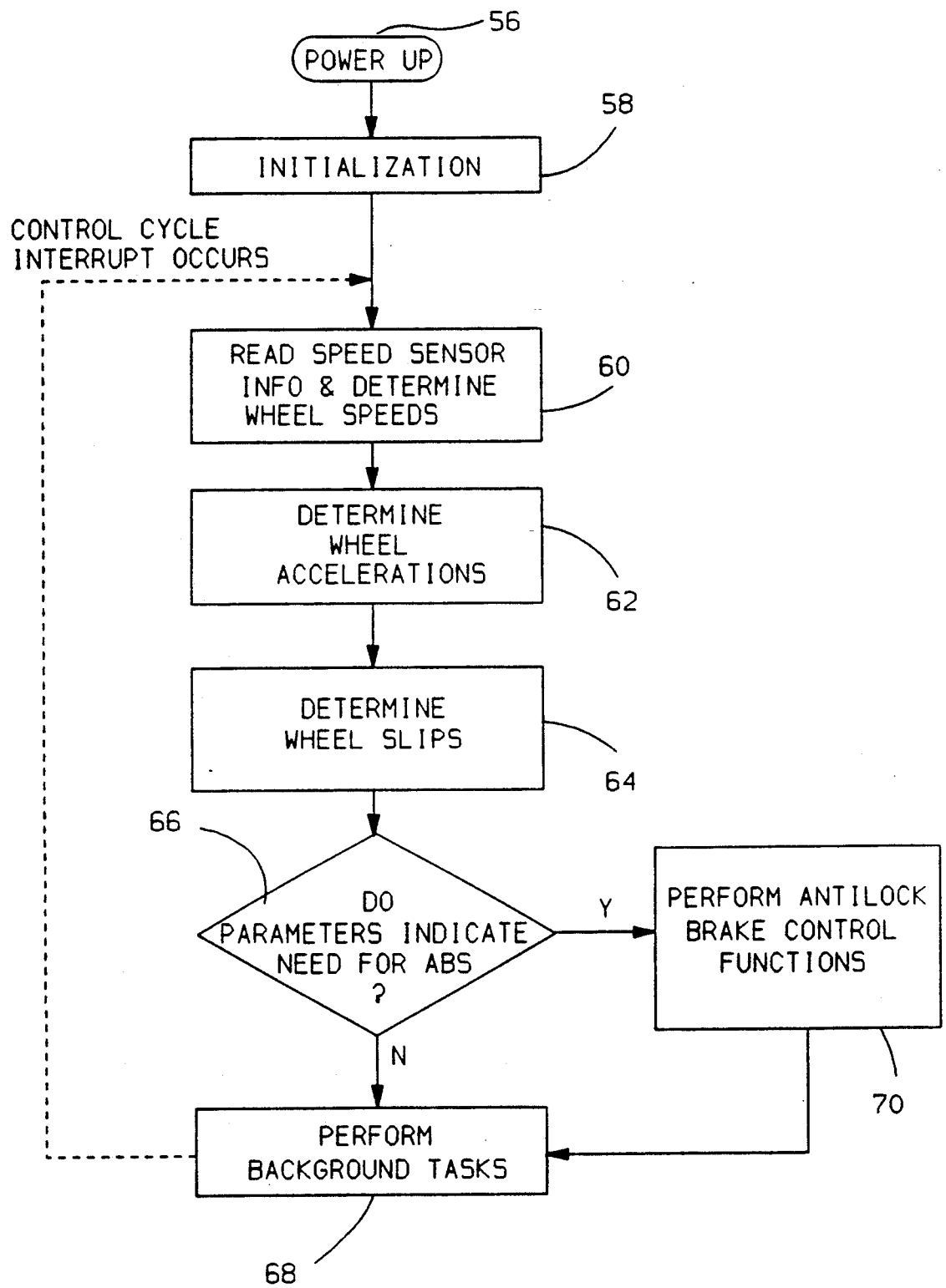
FIGS. 3, 4 and 5 are flow diagrams illustrating the operation of the electronic controller of FIG. 1 in accord, with the principles of this invention.
Figure 4:
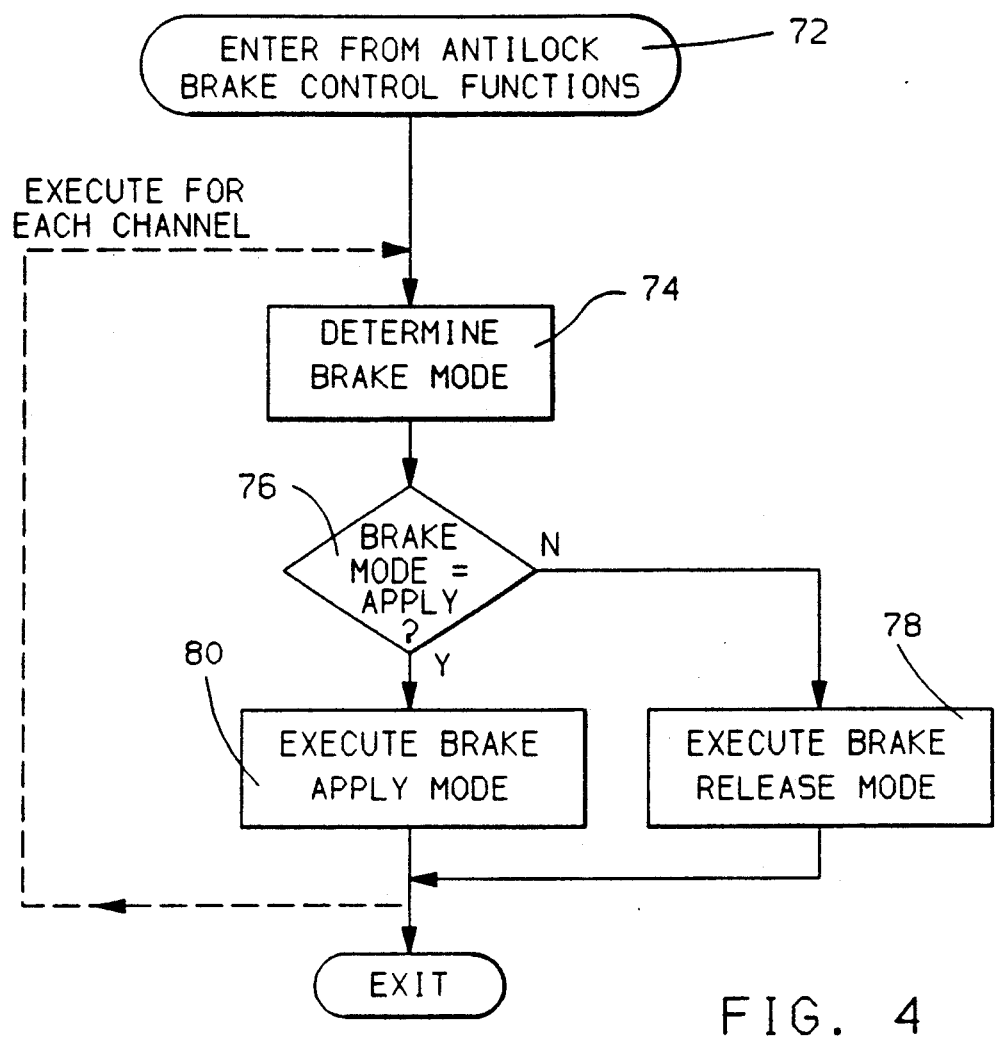
Figure 5:
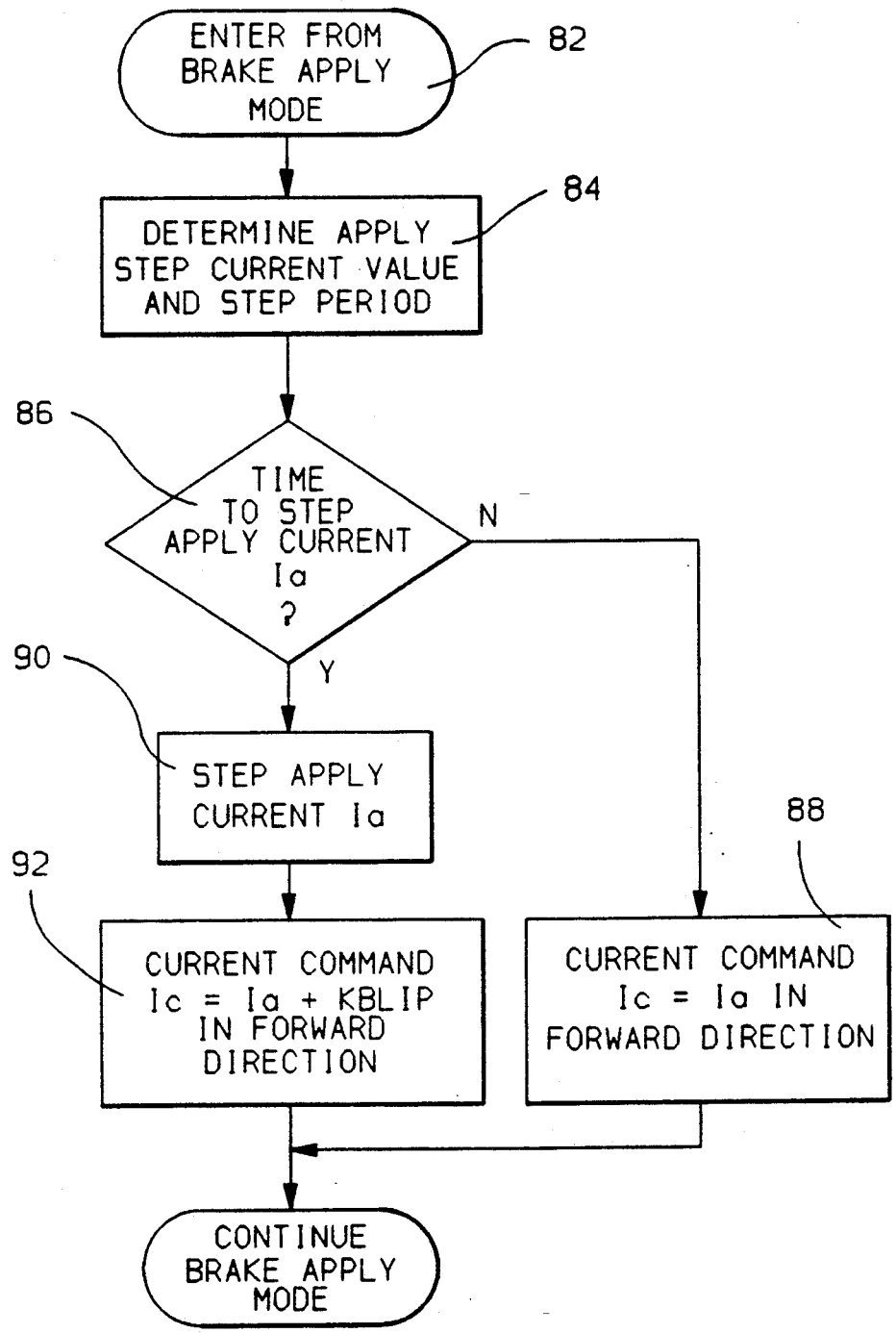

The operation of the electronic controller 28 in controlling the DC torque motor 30 in accord with this invention is illustrated in FIGS. 3 thru 5. The read only memory of the microprocessor 46 contains the instructions necessary to implement the algorithm as diagramed in those figures. Referring first to FIG. 3, when power is first applied to the system from a vehicle battery 54 (FIG. 1) such as when a conventional vehicle ignition switch (not illustrated) is rotated to its "on" position, the computer program is initiated at a point 56 and then provides for system initialization at step 58 which entails clearing registers, initializing various RAM variables to calibrated values and other functions. When the initialization routine is completed, the program proceeds to perform antilock brake control functions as required. These antilock control functions are performed by executing a control cycle in response to each of repeated control cycle interrupts which are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 62 and the individual wheel slip values at step 64. From the computed values of wheel acceleration and wheel slip, the program determines at step 66 whether or not those parameters represent the need for antilock brake pressure modulation for any wheel.

If antilock control of wheel brake pressure is not required, the program proceeds to perform background tasks at step 68. These tasks may include diagnostic functions as well as other functions. However, if step 66 determines that a need for antilock brake pressure modulation for any wheel is required, the program proceeds to a step 70 where antilock brake control functions are executed. Once those functions are executed, the program proceeds to the step 68 previously described.

The foregoing steps 60 thru 70 are repeated once for each control cycle. Thus, when a control cycle interrupt occurs, a new cycle begins at step 60 and the functions represented by steps 60 thru 70 are again repeated as previously described.

Repeated executions of step 70 when antilock brake control is required establishes the following brake cycle. When the wheel slip and acceleration conditions represent an incipient wheel lockup condition, a pressure release mode is indicated and brake pressure is quickly released to allow the wheel to recover from the incipient wheel lockup condition. When wheel acceleration and slip conditions represent a recovered condition, an apply mode is indicated and wheel pressure is re-applied, such as to a significant fraction of the wheel pressure at the time pressure was released, and thereafter ramped until another incipient wheel lockup condition is sensed at which time the release mode is indicated and the cycle is repeated. In the form of control to which this invention relates, the control of the brake pressure is established via control of the current through the DC torque motor 30. Accordingly, brake pressure is released in response to a detected incipient wheel lock condition by controlling current through the DC motor 30 in a reverse direction and pressure is applied by controlling current through the motor 30 in a forward direction. During brake pressure application, the current is ramped at a controlled rate by increasing the current in stepwise fashion.

Referring to FIG. 4, there is illustrated a general flow diagram of the antilock brake control functions executed once for each braking channel where each channel includes a modulator 18. Where the four wheels of the vehicle are controlled independently, this requires the routine of FIG. 4 to be executed four times, once for each wheel with its related parameters. In another system, the rear brakes may be controlled by a single modulator such that the routine of FIG. 4 then is executed once for each front wheel and once for the combined rear wheels.

The antilock brake control routine 70 of FIG. 3 is entered at step 72 and then proceeds to a step 74 that selects the required brake mode. In general, the selection is made from a number of apply modes, such as 3, each having a related rate of increase in brake pressure as a function of wheel acceleration and wheel slip and one or more release modes also as a function of wheel acceleration and wheel slip. For example, the apply modes may provide for higher rates of increase in brake pressure with increasing values of wheel acceleration and with decreasing values of wheel slip. The release modes may provide for full release with high wheel slip and high wheel acceleration values and step-down release with lower wheel slip and wheel acceleration values.

In this embodiment, the particular apply or release brake mode is determined via a ROM stored lookup table storing storing the various apply and release brake modes as a function of wheel acceleration and wheel slip. The stored brake modes establish a threshold between pressure apply and pressure release as a function of wheel acceleration and wheel slip. An incipient wheel lockup condition is indicated when the lookup table first indicates one of the brake release modes whereas a recovered condition is indicated when the lookup table first indicates one of the brake apply modes.

Step 76 then determines whether the brake mode determined at step 74 is one of the apply modes. If not, indicating one of the release modes in response to an incipient wheel lockup condition, the program proceeds to a step 78 which executes a brake release mode routine. In general, the brake release mode 78 provides for control of the torque motor 30 in reverse direction to retract the piston 38 to reduce the brake pressure to allow wheel recovery from the incipient wheel lockup condition.

In the preferred embodiment, when an incipient wheel lockup condition is first detected when the step 74 first indicates a brake release mode, the step 78 stores the commanded motor current $I_c$ as a representation of the motor current at the time the incipient wheel lockup condition is detected. This stored current value represents a measure of the brake pressure producing the maximum brake effort that corresponds to the critical wheel slip. Thereafter with repeated executions of step 78 for the respective wheel, the motor current is controlled in accord with the particular release mode indicated at step 74 to release brake pressure to allow wheel recovery from the incipient wheel lockup condition.

A wheel recovery condition resulting from repeated executions of the brake release mode 78 is detected at step 74 when the lookup table first indicates one of the pressure apply modes for the wheel acceleration and wheel slip conditions. When this condition is determined by step 76, the program proceeds to a step 80 where the apply current $I_a$ for reapplying brake pressure is determined. In the preferred mode, when step 74 first indicates an apply mode, the motor current is set to a significant fraction of the current stored at step 78 when the incipient wheel lockup condition was first detected. Thereafter, with repeated executions of the step 80, the motor current is ramped at a controlled rate to increase the brake pressure at the wheel brake 20 until an incipient wheel lock condition is again sensed by step 74 determining a release mode via the lookup table in response to the wheel acceleration and slip values.

The ramp rate provided via repeated executions of the brake apply mode routine of step 80 is based on the rate corresponding to the particular apply mode determined via the step 74 adjusted by a factor based upon the relationship between the value of the present motor current command to the to the current stored at step 78 when an incipient wheel lock condition was first detected. In general, the rate established at step 74 may be decreased by a factor when the motor current approaches the store current and may be further increased to a high rate when the motor current command exceeds the stored current value. Other basis for determining the rate of pressure increase may be utilized. However established, the rate is then provided by increasing the command current $I_c$ to the motor 30 in stepwise fashion with the rate being controlled by adjusting the amount of the step increase in current and/or the duration between steps of the motor current value. In this embodiment, the step increase in the motor current is a function of the desired rate of increase in brake pressure and the duration between stepping of the motor current is a direct function of the motor current value.

Figure 6:
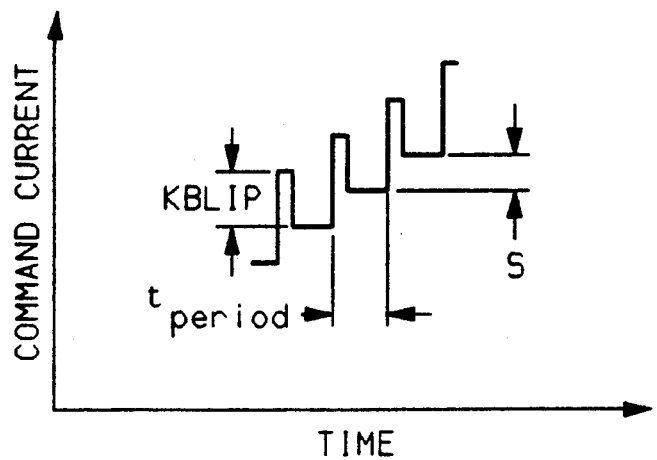
FIG. 6 is a plot illustrating the current applied to the motor of the motor driven pressure modulator of FIG.

To assure that there is adequate torque for restarting the motor if the motor comes to rest during the period of one of the steps, this invention provides for increasing the value of the step current at the beginning of each step period by an amount KBLIP for a duration at least equal to the time constant of the motor driven modulator. The value of KBLIP is such that for the lowest ramp rate wherein the current step is the smallest, the resulting motor torque will be adequate to overcome the static friction of the modulator so that the motor begins rotation. After the termination of the current pulse of amplitude KBLIP, the normal step current value is provided for the remainder of the step period so that a pressure corresponding to the step current value is established by the modulator 18. The motor current command waveform established via this invention is illustrated in FIG. 6 where the motor command current is plotted as a function of time. As can be seen, the current is repeatedly stepped in value by a magnitude S at intervals of time $t_{period}$. At the beginning of each step, a current pulse having the magnitude KBLIP is provided to assure adequate motor torque to overcome the modulator static friction.

The routine embodied in the brake apply mode routine 80 for establishing the commanded motor current $I_c$ in accord with the invention and as illustrated in FIG. 6 is shown in FIG. 5. This routine enters from the brake apply mode routine 80 at step 82 and then determines the apply step current value STEP based upon the desired rate of increase in brake pressure. As previously indicated, this rate is a function of the determined apply brake mode established at step 74 and which may further be adjusted based upon the relationship between the existing motor current command value and the current stored when the brake release mode routine 78 was first entered in response to an incipient wheel lock condition. The step duration $t_{period}$ corresponding to the step current value is also established at this step. The routine then determines whether or not the step period has expired such that it is time to step the apply current value $I_a$. If not, step 88 establishes the motor current command $I_c$ to the torque motor 30 at the last determined apply current value $I_a$ in the motor forward direction. When step 86 determines that the step duration $t_{period}$ has expired such that it is time to again step the motor current, the program proceeds to a step 90 where the apply current value $I_a$ is increased by the value of S determined at step 84. At step 92, the motor command current $I_c$ is established by summing the value KBLIP to the apply current value $I_a$. As previously indicated, KBLIP has a magnitude to assure that the motor torque overcomes the static friction so as to assure that the motor 30 begins to rotate. The brake apply mode routine 80 is continued from step 88 or step 92.

When the routine of FIG. 5 is next executed, the routine proceeds from step 86 to step 88 such that the current command is established at the apply current value $I_a$ last determined at step 90. For the remainder of the step period, this value is commanded to the DC torque motor 30. The foregoing steps are repeated to provide the commanded current waveform as illustrated in FIG. 6 to provide for a continuous predictable increase in the brake pressure as the current is ramped following recovery from the incipient wheel lock condition. In this embodiment, the control cycle interrupts are equal to or greater than the time constant of the modulator 18 such that the current pulse KBLIP is provided only for the duration of one control cycle period. In the case where the time constant is greater than one control cycle period, KBLIP may be provided for additional control cycle periods so that its duration is at least greater than the modulator 18 time constant.

The foregoing description of a preferred embodiment of the invention for the purpose of illustrating the invention is not to be considered as limiting or restriction the invention since many modifications may be made by the exercise of skill in the art without departing from the scope of the invention.

The embodiments of the invention in which an exclusive property or privilege is claimed are defined as follows:

1. A method of controlling the brake pressure applied to the brake of a vehicle wheel traveling over a road surface in a vehicle braking system having a pressure modulator including a motor for generating a motor torque in response to motor current to control the applied brake pressure, the pressure modulator having a static friction value and a time constant value, the method comprising the steps of:

sensing an incipient wheel lockup condition;

controlling the motor current to release brake pressure when an incipient wheel lockup condition is sensed to allow wheel recovery from the incipient wheel lockup condition; and ramping the motor current following wheel recovery to increase the applied brake pressure until an incipient wheel lockup is again sensed by (A) repeatedly increasing the motor current in stepwise fashion by a step current value S and (B) increasing the current by a further value KBLIP for a predetermined time at the beginning of each stepwise increase in the motor current, the sum of S and KBLIP having a value increasing the motor torque by an amount determined to overcome the static friction value of the pressure modulator.

2. The method of claim 1 wherein the predetermined time of increase of the current by the further value KBLIP is greater than the time constant value of the pressure modulator.

3. A method of controlling the brake pressure applied to the brake of a vehicle wheel traveling over a road surface in a vehicle braking system having a pressure modulator including a motor for generating a motor torque in response to motor current to control the applied brake pressure, the pressure modulator having a static friction value and a time constant value, the method comprising the steps of:

sensing an incipient wheel lockup condition;

controlling the motor current to release brake pressure when an incipient wheel lockup condition is sensed to allow wheel recovery from the incipient wheel lockup condition; and ramping the motor current following wheel recovery to increase the applied brake pressure until an incipient wheel lockup is again sensed, the step of ramping the motor current including the steps of (A) determining a desired rate of increase in the brake pressure, (B) determining a step current value, S as a predetermined function of the determined desired rate of increase in brake pressure, (C) repeatedly increasing the motor current by the determined step current value S at intervals of $t_{period}$ and (D) increasing the motor current by a further value KBLIP for a predetermined time at the beginning of each interval of $t_{period}$, the sum of S and KBLIP having a value increasing the motor torque by an amount determined to overcome the static friction value of the modulator.

4. The method of claim 3 wherein the predetermined time of increase of the current by the further value KBLIP is greater than the time constant value of the pressure modulator.

* * * * *